United States Patent [19]
Yoshino

[11] Patent Number: 5,020,863
[45] Date of Patent: Jun. 4, 1991

[54] ANTILOCK CONTROL DEVICE
[75] Inventor: Masato Yoshino, Itami, Japan
[73] Assignee: Sumitomo Electric Industries, Ltd., Osaka, Japan
[21] Appl. No.: 457,164
[22] Filed: Dec. 26, 1989
[30] Foreign Application Priority Data
Dec. 24, 1988 [JP] Japan .................. 63-327426
[51] Int. Cl.⁵ .............................. B60T 8/32
[52] U.S. Cl. ...................... 303/96; 303/100; 303/111; 364/426.02
[58] Field of Search ............ 303/96, 97, 98, 100, 303/92, 102, 103, 109, 111, 95; 188/181 C, 181 R, 181 A; 364/426.01, 426.02, 426.03

[56] References Cited
U.S. PATENT DOCUMENTS
4,059,312 11/1977 Jonner .................. 303/111 X
4,933,854 6/1990 Miyake ................. 303/111 X Primary Examiner—Douglas C. Butler
Attorney, Agent, or Firm—Wenderoth, Lind & Ponack

[57] ABSTRACT

An antilock control device is controlled according to first and second control modes. In the first control mode, first and second pressure control signals applied to the braking devices of the right and left front wheels are determined independently from one another. In the second control mode, both of the first and second pressure control signals are determined based on a locking tendency of the one of the right and left front wheels having a higher wheel speed than the other. A time duration is measured in which the first and second pressure control signals are each for continuously reducing, or alternately reducing and maintaining, the braking pressure of the right and left front wheels, respectively. The first control mode is selected when the time duration is less than a predetermined value, and the second control mode is selected when the time duration is more than a predetermined value.

10 Claims, 3 Drawing Sheets

ANTILOCK CONTROL DEVICE

BACKGROUND OF THE INVENTION

1. Field of the Invention.

The present invention relates to an antilock control device.

2. Description of the Related Art.

The purpose of an antilock control device is to control the slip rate of the wheels of a motor vehicle such that the frictional force between the road surface and the tires is maximized.

It is known that when a vehicle enters a puddle at a high speed, a film of water forms between the tires and the road surface. In this condition, it is not possible to obtain the required frictional force between the tires and the road surface, since the coefficient of friction of the road surface is significantly lowered (this is called a hydroplaning phenomenon).

If the brakes are applied during hydroplaning or when the vehicle is on a frozen road surface, the coefficient of friction which is actually very low, the resistance of water and the inertia of the wheels will become larger than the recovering force imparted to the tires. This situation makes it impossible for the wheels to sufficiently recover their wheel speed even if the antilock control device is activated to reduce the braking pressure.

In such a situation, the antilock control device is noneffective and the braking pressure must be reduced to a minimum based on the judgement that the wheel speeds have failed to recover. However, if this is an incorrect judgement resulting from, for example, a failure of the wheel speed sensors, the driver may be endangered since the brakes are actually not working.

In order to prevent this, various failsafe measures have been proposed. One such measure is to stop reducing the braking pressure and to increase it instead if the pressure reduction phase continue for more than a predetermined period of time.

One problem with this particular failsafe measure is that, since the antilock control of the wheels is disabled, this judgement must be made with great care and thus a long period of time is required.

Further, when hydroplaning takes place or when the vehicle is traveling on a frozen road surface, it is conceivable that the antilock control for only one of the wheels will cease to operate, thus increasing the braking pressure on this one wheel only. If the hydroplaning ceases or the vehicle exits the frozen area of the road surface onto a road surface area having a high coefficient of friction while the braking pressure on this one wheel is kept at a higher level, the vehicle might spin out of control due to a large difference in the braking force between this one wheel and the remaining wheels.

SUMMARY OF THE INVENTION

It is an object of the present invention to provide an antilock control device which is capable of maintaining a sufficiently high braking force and vehicle stability even when hydroplaning takes place or while the vehicle is temporarily traveling on a frozen road surface.

In accordance with the present invention, the electronic control unit in the antilock control device includes a control mode changeover unit for selecting one of a first control mode in which the brake pressure control signals for the front right wheel and those for the front left wheel are determined independently from each other, and a second control mode in which the pressure control signals for both front wheels are determined based on the locking tendency of one of the front wheels judged to be rotating at a higher speed than the other, and a timer for measuring the duration of fluid pressure control signals for continuously reducing or alternately reducing and holding the braking pressure on both front wheels. The control mode changeover unit is adapted to select the second control mode if the duration exceeds a predetermined value and to select the first control mode if the duration is smaller than the predetermined value.

The antilock control device according to the present invention is adapted to control the braking pressure on the front right and front left wheels independently from one other in normal conditions. On the other hand, if the timer finds that the braking pressure on both front wheels is maintained in either the reduction phase or the reduction-hold combination phase for more than a predetermined period of time, the evaluation result for the wheel rotating at a lower speed is replaced with that for the wheel rotating at a higher speed. In other words, the control mode for the front wheels is switched to "select-high".

Suppose that both front wheels are traveling in a puddle of water or on a frozen road surface. The frictional force available to brake the wheels is so small in such a situation that the recovery of the wheel speeds tends to be delayed. This will cause the antilock control device to continue to provide a command to either continuously reduce or alternately reduce and hold the braking pressure. If this happens, the braking pressure control mode is adapted to switch to the "select-high" mode so that the braking pressure on the wheel which is slow in the recovery of the wheel speed will be controlled on the basis of the information from the wheel which is fast in the recovery of wheel speed. With this arrangement, if one of the front wheels exits the hydroplaning influence or the frozen road surface while the other does not, the braking pressure determined based on the frictional force between the former wheel and the road surface is applied to both wheels. This means that the former wheel can be braked with a gradually increasing braking force and the latter wheel can be braked with a suitable braking force as soon as it exits the hydroplaning influence or the frozen road surface. This will prevent the vehicle from spinning.

BRIEF DESCRIPTION OF THE DRAWINGS

Other features and objects of the present invention will become apparent from the following description taken with reference to the accompanying drawings, in which.

DETAILED DESCRIPTION OF THE PREFERRED EMBODIMENT

Figure 1:
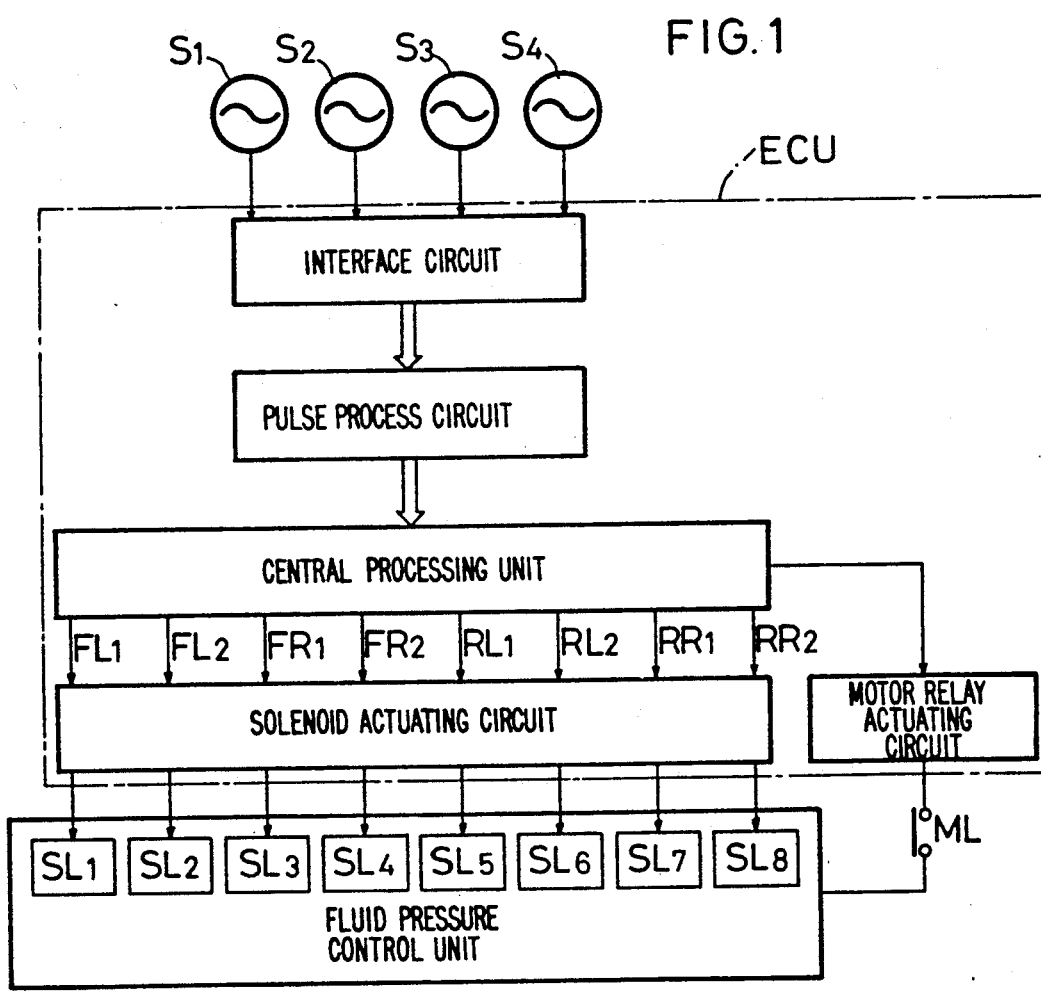
FIG. 1 is a block diagram of the antilock control device according to the present invention.

As shown in FIG. 1, the antilock control device according to the present invention includes wheel speed sensors S1 to S4, an electronic control unit ECU and a fluid pressure control unit. The electronic control unit ECU includes an interface circuit, a pulse processing circuit, a central processing unit, a solenoid actuating circuit and a motor relay actuating circuit.

The output signals (AC voltage signals) from the wheel speed sensors S1 to S4 are converted into pulses by the interface circuit. The pulses are counted and calculated in the pulse processing circuit. Based on the results thus obtained, calculation, analysis and judgement are performed by the central processing unit according to a program stored therein so as to command the solenoid actuating circuit and the motor relay actuating circuit to actuate solenoids SL1-SL8 each associated with a pressure control valve, and a motor relay ML, respectively.

The control signals from the central processing unit are fed to the solenoid actuating circuit through signal lines FL1 and FR1, FL2 and FR2, RL1 and RR1 and RL2 and RR2 and then to the solenoids SL1 and SL3 of first control valves for both front wheels, SL2 and SL4 of second control valves for both front wheels, SL5 and SL7 of the first control valves for both rear wheels, and SL6 and SL8 of second control valves for both rear wheels, respectively. The lines RL1 and RR1 for SL5 and SL7 of the first control valves and the lines RL2 and RR2 and for SL6 and SL8 of the second control valves may be replaced with a single line.

The operation of the fluid pressure control unit for the front wheels will now be described with reference to FIG. 2.

The first control valves 1 and 3, actuated by the solenoids SL1 and SL3, are provided in lines extending from a master cylinder MC to wheel cylinders W1 and W2 for the front wheels. The second control valves 2 and 4, actuated by the solenoids SL2 and SL4, are provided in return lines extending from the wheel cylinders W1 and W2 back to the master cylinder MC. In the operating state shown in FIG. 2, the solenoids SL1 to SL4 are all deenergized and thus the control signals sent via the lines FR1, FL1, FL2 and FR2 are all OFF.

In this state, the first control valves 1 and 3 are kept open while the second control valves 2 and 4 are closed. This means that the master cylinder MC communicates with the wheel cylinders W1 and W2 in that a closed hydraulic circuit is established therebetween. Thus, the braking pressure generated in the master cylinder MC will be directly applied to the wheel cylinders W1 and W2 and the braking pressures on both front wheels are in a pressure increase control phase.

If it is necessary to switch the control phase from pressure increase to pressure hold only for the front left wheel, an ON signal is transmitted on the line FL1. This will energize the solenoid SL1, thus closing the first control valve 1. Since the second control valve 2 is kept closed in this state, brake fluid will be sealed in the wheel cylinder W1 and the braking pressure will thus be maintained.

Similarly, the control phase for the front right wheel can be switched from pressure increase to pressure hold by providing an ON signal on line FR1.

To hold the braking pressure on both front wheels, ON signals are provided on both lines FR1 and FL1.

To reduce the braking pressure on the front left wheel, ON signals are provided on lines FL1 and FL2 and the motor relay ML is closed by the motor relay actuating circuit to start a motor M. This will energize the solenoids SL1 and SL2, thus closing the first control valve 1 and opening the second control valve 2, so that the wheel cylinder W1 will communicate with a reservoir R1. The brake fluid in the reservoir R1 will be drawn by a pump P1 and fed back into the master cylinder MC. The brake pressure will thus decrease.

Similarly, the brake pressure on the front right wheel can be reduced by providing ON signals on lines FR1 and FR2 and by causing the motor relay actuating circuit to close the motor relay ML.

Figure 2:
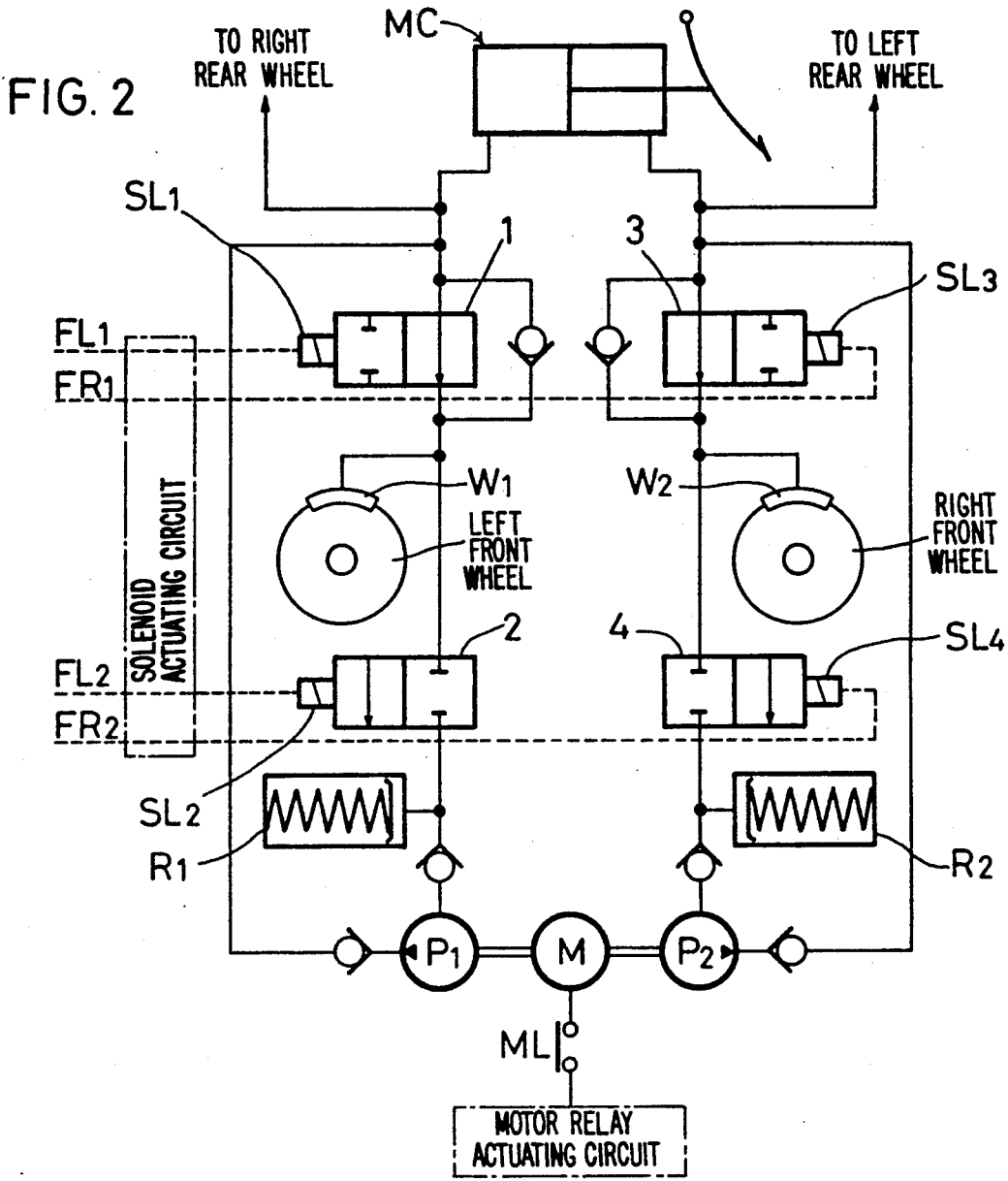
FIG. 2 is a diagrammatic view of the fluid pressure control circuit for the front wheels.

As shown in FIG. 2, the master cylinder MC has two fluid pressure generating chambers. One of these chambers is connected to the front left and rear right wheel brakes, whereas the other is connected to the front right and rear left wheel brakes by means of so-called X-piping.

The brake system for the rear wheels also has first and second control valves, pumps and a motor similar to those shown in FIG. 2.

According to the present invention, the braking pressures on the right and left wheels are increased, maintained and reduced according to either an independent mode or on a select-high mode. The control mode is changed over by a changeover operation, which will be described next.

Figure 3:
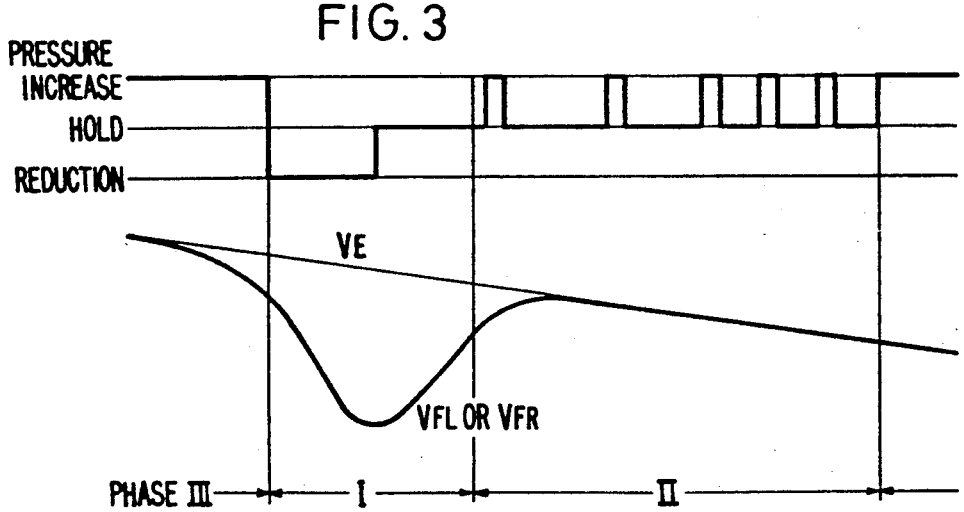
FIG. 3 is a graph showing the relationship between the pressure control phase and the wheel speeds and the vehicle speed.

When the brakes are applied while the vehicle is moving, the central processing unit (FIG. 1) makes a judgement as to whether the wheels are exhibiting a tendency to enter a locked state or recovering from the locked state by comparing the estimated vehicle speed VE with the wheel speeds VFL and VFR of the front left and front right wheels (FIG. 3), and in response to this judgement provides a fluid pressure control signal to increase, hold or decrease the braking pressure on each wheel. According to the present invention, three phases are contemplated to control the braking pressure, i.e. Phase I in which the pressure reduction signal is given continuously or the pressure reduction and pressure hold signals are given alternately, Phase II in which the pressure increase signal is given continuously or the pressure increase and pressure hold signals are given alternately, and Phase III in which the pressure increase command is given continuously (antilock control inoperative).

Figure 4:
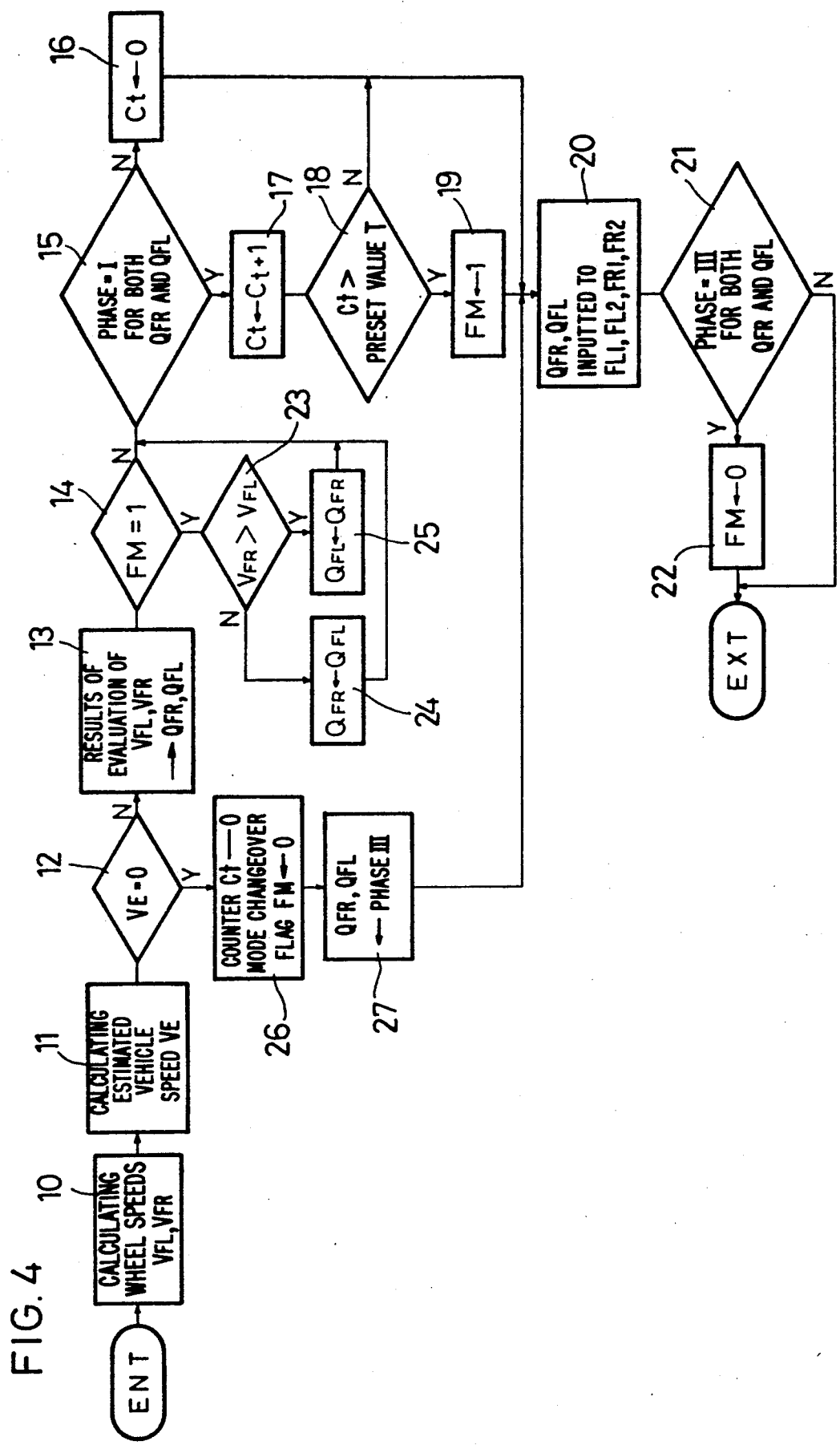
FIG. 4 is a flow chart of the mode changeover operation.

The central processing unit has a main program for initializing a subroutine as shown in FIG. 4, clearing a timer counter Ct, resetting a mode changeover flag FM and setting the pressure control phase to Phase III (antilock control inoperative). After permission of interruption has been given in the main program, the subroutine shown in FIG. 4 is executed.

Though FIG. 4 shows only a processing flow for the front wheels, similar calculations and judgements for antilock control are made for the rear wheels, too. The subroutine starts with Step 10 where the wheel speeds VFL and VFR of the front left and front right wheels are calculated. In Step 11, the estimated vehicle speed VE is calculated, which is obtained by filtering the highest wheel speed.

In Step 12, it is determined whether or not the estimated vehicle speed VE is zero, in other words, whether or not the vehicle is at a stop. If the vehicle is judged to be in motion, the vehicle speeds VFL and VFR are evaluated in Step 13. The purpose of this evaluation is in principle to determine whether the wheels are exhibiting a tendency to lock or recovering from locked state. It is carried out by comparing the deceleration of each wheel with a reference value, by comparing the slip speed (vehicle speed minus wheel speed) of each wheel with a reference value, or by the use of some other suitable index. In view of the result of this evaluation, one of the three phases I to III is selected for each of the front left and front right wheels and the result of evaluation is stored as QFL and QFR, respectively.

In Step 14, it is determined whether or not the mode changeover flag FM is set. In the initial cycle, the program proceeds to Step 15 because the flag FM is reset to 0 in the main program.

In Step 15, it is determined whether or not both QFL and QFR are Phase I, in other words, whether or not the result of judgement is to reduce or alternately reduce and hold the braking pressures on both front wheels.

If judged No in Step 15, the program proceeds to Step 20 after clearing the timer counter Ct in Step 16.

If judged Yes in Step 15, the timer counter Ct is incremented by one count in Step 17 and a judgement is made in Step 18 as to whether or not the count of the timer counter Ct is larger than a predetermined value T. If judged so, the mode changeover flag FM is set in Step 19 so as to switch the control mode to "select-high" in the next cycle.

In Step 20, ON and OFF signals are given to the solenoid actuating circuit through the signal lines FL1, FL2, FR1 and FR2 (FIG. 1) according to the contents of QFL and QFR. Steps 21 and 22 are provided to reset the mode changeover flag FM if the antilock control is inoperative.

If the judgement in Step 14 is Yes in any given cycle of the subroutine, the evaluation result for the wheel rotating at a lower speed is replaced with that for the wheel rotating at a higher speed in Steps 23 to 25, i.e. the control mode is switched to "select-high". Instead of judging by comparing the wheel speeds of both wheels with each other, the results of evaluation themselves may be compared with each other so as to replace one of them on the low pressure side with the other on the high pressure side.

If the vehicle comes to a stop and thus the vehicle speed is judged to be zero in Step 12, the program will proceed to Step 20 after initialization in Steps 26 and 27.

I claim:

1. An antilock control device comprising:
    first and second wheel speed sensor means for respectively detecting a wheel speed of a right front wheel and a left front wheel of a motor vehicle and for outputting corresponding first and second wheel speed signals;
    an electronic control means for processing said first and second wheel speed signals so as to determine whether the right front wheel and the left front wheel are exhibiting a tendency to enter a locked state and whether the right front wheel and the left front wheel are recovering from a locked state, and for outputting first and second pressure control signals for selectively reducing, maintaining, and increasing a braking pressure applied to the right front wheel and the left front wheel, respectively; and,
    a fluid pressure control means for controlling the braking pressure applied to the right front wheel and the left front wheel in accordance with said first and second pressure control signals, respectively;
    said electronic control means comprising (a) control mode changeover means for selecting one of a first control mode in which said first and second pressure control signals are determined independently from one another, and a second control mode in which said both of said first and second pressure control signals are determined based on a locking tendency of one of the right front and left front wheels having a higher wheel speed than the other, and (b) a timer means for measuring a duration in which said first and second pressure control signals are both for one of continuously reducing, and alternatively reducing and maintaining, the braking pressure to the right front and left front wheel, respectively;
    said control mode changeover means operative to select said first control mode when said duration is less than a predetermined value, and to select said second control mode when said duration is more than a predetermined value.

2. An antilock control device as recited in claim 1, said electronic control means further comprising means for resetting said timer means when at least one of said first and second pressure control signals denotes an increase in the brake pressure.

3. An antilock control device comprising:
    first and second wheel speed sensor means for respectively detecting a wheel speed of a right front wheel and a left front wheel of a motor vehicle and for outputting corresponding first and second wheel speed signals;
    an electronic control means for processing said first and second wheel speed signals so as to determine whether the right front wheel and the left front wheel are exhibiting a tendency to enter a locked state and whether the right front wheel and the left front wheel are recovering from a locked state, and for outputting first and second pressure control signals for selectively reducing, maintaining, and increasing a braking pressure applied to the right front wheel and the left front wheel, respectively; and,
    a fluid pressure control means for controlling the braking pressure applied to the right front wheel and the left front wheel in accordance with said first and second pressure control signals, respectively;
    said electronic control means comprising (a) evaluating means for evaluating said first and second wheel speed signals to obtain first and second evaluation results, each of said first and second evaluation results corresponding to one of three phases in which a first phase denotes a continuous pressure reduction or an alternating pressure reduction and pressure maintenance, in which a second phase denotes a continuous pressure increase or an alternating pressure increase and pressure maintenance, and in which a third phase which denotes a continuous pressure increase indicating that antilock control is inoperative, (b) control mode changeover means for selecting one of a first control mode in which said first and second pressure control signals correspond respectively to said first and second evaluation results, and a second control mode in which both of said first and second pressure control signals correspond to a same one of said first and second evaluation results which is associated with one of the right front and left front wheels having a higher wheel speed relative to the other, and (c) timer means for measuring a duration in which both of said first and second evaluation results correspond to said first phase during said first control mode;

said control mode changeover means operative to select said first control mode when said duration is less than a predetermined value, and to select said second control mode when said duration is more than the predetermined value.

4. An antilock control device as recited in claim 3, said electronic control means further comprising means for resetting said timer means when at least one of said first and second evaluation results denotes one of said second and third phases during said first control mode.

5. An antilock control device as recited in claim 4, wherein when a velocity of the motor vehicle is substantially zero, said first and second evaluation results each denote said third phase, and wherein said control mode changeover means selects said first control mode when both said first and second evaluation results denote said third phase.

6. An antilock control device as recited in claim 5, wherein said evaluating means periodically evaluates said first and second wheel speed signals according to a control cycle, and wherein said timer means includes a counter in which a counter value is incremented during each control cycle when said first and second evaluation results correspond to said first phase during said first control mode, said counter value denoting said duration.

7. An antilock control device as recited in claim 4, wherein said evaluating means periodically evaluates said first and second wheel speed signals according to a control cycle, and wherein said timer means includes a counter in which a counter value is incremented during each control cycle when said first and second evaluation results correspond to said first phase during said first control mode, said counter value denoting said duration.

8. An antilock control device as recited in claim 3, wherein when a velocity of the motor vehicle is substantially zero, said first and second evaluation results each denote said third phase, and wherein said control mode changeover means selects said first control mode when both said first and second evaluation results denote said third phase.

9. An antilock control device as recited in claim 8, wherein said evaluating means periodically evaluates said first and second wheel speed signals according to a control cycle, and wherein said timer means includes a counter in which a counter value is incremented during each control cycle when said first and second evaluation results correspond to said first phase during said first control mode, said counter value denoting said duration.

10. An antilock control device as recited in claim 3, wherein said evaluating means periodically evaluates said first and second wheel speed signals according to a control cycle, and wherein said timer means includes a counter in which a counter value is incremented during each control cycle when said first and second evaluation results correspond to said first phase during said first control mode, said counter value denoting said duration.

* * * * *